United States Patent
Berchtold et al.

(10) Patent No.: US 11,366,440 B2
(45) Date of Patent: Jun. 21, 2022

(54) METHOD FOR CONTROLLING AN OZONE GENERATING MACHINE

(71) Applicant: SUEZ GROUPE, Paris la Defense (FR)

(72) Inventors: Martin Berchtold, Zurich (CH); Tito Scherrer, Rueschlikon (CH); Luca Ramoino, Uster (CH)

(73) Assignee: E2INTERACTIVE, INC., Atlanta, GA (US)

( * ) Notice: Subject to any disclaimer, the term of this patent is extended or adjusted under 35 U.S.C. 154(b) by 136 days.

(21) Appl. No.: 16/622,909

(22) PCT Filed: Jun. 29, 2018

(86) PCT No.: PCT/EP2018/067519
§ 371 (c)(1),
(2) Date: Dec. 13, 2019

(87) PCT Pub. No.: WO2019/002529
PCT Pub. Date: Jan. 3, 2019

(65) Prior Publication Data
US 2020/0117157 A1    Apr. 16, 2020

(30) Foreign Application Priority Data
Jun. 30, 2017   (EP) .................................... 17305838

(51) Int. Cl.
*G05B 19/042* (2006.01)
*C01B 13/11* (2006.01)

(52) U.S. Cl.
CPC ........ *G05B 19/0426* (2013.01); *C01B 13/115* (2013.01); *G05B 2219/25316* (2013.01)

(58) Field of Classification Search
CPC ... C01B 13/11; C01B 2201/90; C01B 13/115; G05B 19/042; G05B 19/0426; G05B 2219/25316
See application file for complete search history.

(56) References Cited

U.S. PATENT DOCUMENTS

2006/0266950 A1* 11/2006 Acevedo ............... G01S 3/7861
250/372
2007/0230979 A1* 10/2007 Hasegawa .......... G03G 15/0194
399/49
(Continued)

FOREIGN PATENT DOCUMENTS

EP    2690062 A1    1/2014
WO    9749636 A1    12/1997

OTHER PUBLICATIONS

International Search Report completed Sep. 18, 2018; 3 pages.

*Primary Examiner* — Tuan C Dao
(74) *Attorney, Agent, or Firm* — Landmark Intellectual Property Law, LLC; Gregory M Murphy

(57) ABSTRACT

Method for controlling an ozone generating machine (OGM) comprising the steps of:
wherein each base setting file (BSF) is dedicated to a type of ozone generating machine (OGM),
retrieving and reading a dedicated base setting file (BSF) corresponding to the type of the ozone generating machine (OGM) indicated by a identification code (ID),
encoding and writing a system configuration file (Sysconf) based on the dedicated base setting file (BSF), comprising at least a set of sensor coefficients (SK) and a set of actuator coefficients (AK),
producing ozone with the ozone generating machine (OGM), said step comprising at least a step of correcting the at least one sensor signal (SSI) with at least one (Continued)

sensor coefficient (SK) or actuating the at least one actuator (ACT) with the at least one actuator control signal (ACS) corrected by at least one actuator coefficient (AK).

9 Claims, 3 Drawing Sheets

(56) References Cited

U.S. PATENT DOCUMENTS

| | | | |
|---|---|---|---|
| 2011/0046796 A1* | 2/2011 | Brochu | A61H 33/005 700/282 |
| 2011/0144515 A1* | 6/2011 | Bayer | G01N 33/497 600/529 |
| 2013/0249808 A1* | 9/2013 | Silk | G06F 3/0416 345/173 |
| 2013/0300588 A1* | 11/2013 | Kuga | G07C 5/0816 340/984 |
| 2014/0042012 A1 | 2/2014 | Clement et al. | |
| 2015/0064340 A1* | 3/2015 | Curran | C03C 17/30 427/8 |
| 2016/0263261 A1* | 9/2016 | Trapani | A61L 2/202 |
| 2017/0072082 A1* | 3/2017 | Jurak | A61L 9/22 |
| 2017/0096279 A1* | 4/2017 | Campalans | G07C 9/00896 |
| 2018/0055963 A1* | 3/2018 | Richardson | A61L 2/20 |
| 2018/0193507 A1* | 7/2018 | Tapp | C02F 1/008 |

* cited by examiner

METHOD FOR CONTROLLING AN OZONE GENERATING MACHINE

The present invention relates to the field of water treatment thanks to ozone, and relates in particular to a method for controlling an ozone generating machine.

It is known from the prior art document US2006049738 a method for controlling an ozone generating machine, which presents a number a sensors, actuators and devices to be controlled so as to produce a required amount of ozone (concentration, flow, pressure . . . ). Such machine is often dedicated to a specific range of production of ozone, or to specific requirements from a client and necessitates a specific control unit. In addition, it is known that sensors, actuators can deviate from their nominal functioning, thereby inducing deviations in the ozone production.

The disadvantages of the method proposed by this document are that it is required to design and manufacture a dedicated control unit for each specific range of production of ozone, or for each specific requirements of a client, and there is no possibility to have a flexible controlling method for an installed park of machines.

An aim of the present invention is to deal with disadvantages of the prior art document mentioned above, and in particular to propose a method for controlling an ozone generating machine that is flexible and adaptable to different types of machine to improve maintainability and learnability of the whole installed park of machines, but also to reduce the ozone production variability despite variability or drift of sensors and actuators of the ozone generating machine.

A first aspect of the present invention is a method for controlling an ozone generating machine comprising:
- a control unit,
- at least one sensor arranged for emitting at least one sensor signal to the control unit,
- at least one actuator arranged to be controlled by at least one actuator control signal generated by the control unit, and
- an ozone generating machine identification code, the method comprising the steps of:
- connecting to the ozone generating machine a data storing device storing a set of base setting files, wherein each base setting file is dedicated to a type of ozone generating machine, and
- reading the ozone generating machine identification code indicating the type of the ozone generating machine, and
- retrieving and reading on the data storing device a dedicated base setting file corresponding to the type of the ozone generating machine indicated by the identification code, and
- encoding and writing on an end user data storing device a system configuration file based on the dedicated base setting file, the system configuration file comprising at least a set of sensor coefficients and a set of actuator coefficients,
- producing ozone with the ozone generating machine, said ozone production step comprising at least a step of correcting the at least one sensor signal emitted by the at least one sensor with at least one sensor coefficient belonging to the set of sensor coefficients and/or actuating the at least one actuator with the at least one actuator control signal corrected by at least one actuator coefficient belonging to the set of actuator coefficients.

This allows to propose a method for controlling an ozone generating machine with an high flexibility, with a common set of base setting files for the whole installed park of machines, but with a specific adaptation of the needs of a specific type of machine and also with an enhanced maintainability. Indeed, this allows a globalized correction of coefficients in all the installed park of machines but also to easier the installation and settings of coefficients on a specific machine. In particular, the same base setting files are available at the first run of the machine so that with the identification code, a specific configuration file is built to enable the adequate control of the machine with all its specific sensors and actuators. We hear by sensor signal a signal emitted by a sensor, representing the physical measure done by the sensor. We hear by actuator control signal a signal emitted by the control unit to control the actuator. Each type of ozone generating machine comprises an identification code. The system configuration file is used for controlling the ozone generating machine. In other words, the method allows to have several piloting coefficients files for sensor(s) and actuator(s), each file being dedicated to one of different machines.

Advantageously, the method for controlling the ozone generating machine further comprises the steps of:
- determining a predicted ozone concentration at an output of the ozone generating machine based on the at least one sensor signal or on the at least one actuator control signal,
- measuring an actual ozone concentration with an ozone concentration sensor at the output of the ozone generating machine,
- comparing the predicted ozone concentration with the actual ozone concentration,
- correcting and overwriting the set of sensor coefficients and the set of actuator coefficients of the system configuration file based on the actual ozone concentration if a discrepancy between the predicted ozone concentration and the actual ozone concentration is more than an ozone concentration threshold.

Advantageously, the method for controlling the ozone generating machine further comprises the steps of:
- step 1: determining a predicted ozone concentration at an output of the ozone generating machine based on the at least one sensor signal or on the at least one actuator control signal.
- step 2: measuring an actual ozone concentration with an ozone concentration sensor at the output of the ozone generating machine,
- step 3: comparing the predicted ozone concentration with the actual ozone concentration,
- step 4: correcting and overwriting the set of sensor coefficients and the set of actuator coefficients of the system configuration file based on the actual ozone concentration if a discrepancy between the predicted ozone concentration and the actual ozone concentration is more than an ozone concentration threshold.

This allows to manage a drift of ozone concentration with the help of adjustments on sensors coefficients or actuators coefficients. This also allows to predict an ozone concentration so that both production and maintenance can be enhanced. Moreover, this allows to calibrate and to correct the sensor signals and the actuator control signals, thus improving the ozone production. Improvements can be then deployed on others machines due to the learnability of the ozone generating machine, thanks to the system configuration file. We hear by correcting the set of sensor coefficients and the set of actuator coefficient any correction that permits to reduce the discrepancy between the predicted ozone concentration and the actual ozone concentration either by correction the actuation or correcting the measurement. In other words, the method allows to control the machine, and not only to alert an operator with a failure message if a failure is detected.

Advantageously, the method for controlling an ozone generating machine further comprises the step of:
mounting the ozone concentration sensor on the ozone generating machine or on a distribution circuit located downstream an output connection of the ozone generating machine.

This enables to better control the ozone concentration at the output of the ozone generating machine, and to allow an implementation of the method on the installed park of machine, for example on the distribution circuit. In particular, even if the machine is not equipped with an ozone concentration sensor, it is enough to install it on the machine, for the calibration step only. We hear by calibration step a measurement or checking of the signals emitted by sensors and emitted for controlling actuator and the corresponding correction of set of sensor coefficients and set of actuator coefficients. The mounting of the ozone concentration sensor is particularly interesting for a "plug and play" use, that is to say, using the ozone generating machine and checking on a regular basis, that there is no drift nor variation on the ozone production, and to recover expected ozone production if necessary.

Advantageously, the method for controlling an ozone generating machine wherein the system configuration file contains a initial frequency to operate at least one of the steps of:
determining a predicted ozone concentration at an output of the ozone generating machine based on the at least one sensor signal or on the at least one actuator control signal,
measuring an actual ozone concentration with an ozone concentration sensor at the output of the ozone generating machine.
comparing the predicted ozone concentration with the actual ozone concentration,
correcting and overwriting the set of sensor coefficients and the set of actuator coefficients of the system configuration file based on the actual ozone concentration if a discrepancy between the predicted ozone concentration and the actual ozone concentration is more than an ozone concentration threshold,
defining an updated frequency of the system configuration file to operate at least one of the steps of:
determining a predicted ozone concentration at an output of the ozone generating machine based on the at least one sensor signal or on the at least one actuator control signal,
measuring an actual ozone concentration with an ozone concentration sensor at the output of the ozone generating machine,
comparing the predicted ozone concentration with the actual ozone concentration.
correcting and overwriting the set of sensor coefficients and the set of actuator coefficients of the system configuration file based on the actual ozone concentration if a discrepancy between the predicted ozone concentration and the actual ozone concentration is more than an ozone concentration threshold,
based on the actual ozone concentration and/or the discrepancy,
correcting and overwriting said updated frequency of the system configuration file.

Advantageously, the method for controlling an ozone generating machine further comprises the steps of:
defining a frequency at which at least one of the steps of: step 1 to 4 is implemented,
setting the frequency based on the actual ozone concentration and/or the discrepancy.

This allows to better manage the ozone concentration and production, and to refine the precision of the prediction, the measurement, the comparison, the correction and the overwriting, so that values are checked whenever necessary. In other words, in normal conditions, low frequency is applied, to store/process minimum amount of data, but when necessary, the frequency is increased, to rapidly detect and react if a discrepancy or a drift is noticed.

Advantageously, the method for controlling an ozone generating machine,
the ozone generating machine further comprising at least one consumable source, such as at least one oxygen bottle or oxygen batch, and
a consumable source sensor, arranged for indicating a status of the at least one consumable source, such as ready or empty,
the method further comprises the steps of:
monitoring the status of the at least one consumable source.
executing at least one of the steps of:
determining a predicted ozone concentration at an output of the ozone generating machine based on the at least one sensor signal or on the at least one actuator control signal,
measuring an actual ozone concentration with an ozone concentration sensor at the output of the ozone generating machine.
comparing the predicted ozone concentration with the actual ozone concentration,
correcting and overwriting the set of sensor coefficients and the set of actuator coefficients of the system configuration file based on the actual ozone concentration if a discrepancy between the predicted ozone concentration and the actual ozone concentration is more than an ozone concentration threshold,
if a change in the status is detected.

Advantageously, the method for controlling an ozone generating machine.
the ozone generating machine further comprising at least one consumable source, such as at least one oxygen bottle or oxygen batch, and
a consumable source sensor, arranged for indicating a status of the at least one consumable source, such as ready or empty.
the method further comprises the steps of:
monitoring the status of the at least one consumable source,
executing at least one of the steps of:
step 1 to 4,
if a change in the status is detected.

Advantageously, the method for controlling an ozone generating machine,
the ozone generating machine further comprises at least one input arranged to supply oxygen from a consumable source, such as at least one oxygen tank,
the method further comprising the steps of:
executing at least one of the steps:
determining a predicted ozone concentration at an output of the ozone generating machine based on the at least one sensor signal or on the at least one actuator control signal:

measuring an actual ozone concentration with an ozone concentration sensor at the output of the ozone generating machine, comparing the predicted ozone concentration with the actual ozone concentration.

correcting and overwriting the set of sensor coefficients and the set of actuator coefficients of the system configuration file based on the actual ozone concentration if a discrepancy between the predicted ozone concentration and the actual ozone concentration is more than an ozone concentration threshold, when the consumable source is changed.

This allows a change of consumable and a fast calibration, correction and overwriting of the sensors coefficients and actuators coefficients, so that optimum control and efficiency of the ozone generating machine is reached.

Advantageously, the ozone generating machine further comprises at least two electrodes separated by an ozonizing gap and a dielectric layer, and at least one electrode power sensor arranged for measuring a power consumed by the at least one electrode, the method further comprising:

supplying electric power to the a least two electrodes so as to create electric discharges in the ozonizing gap, monitoring the power consumed by the at least two electrodes, executing at least one of the steps of:

determining a predicted ozone concentration at an output of the ozone generating machine based on the at least one sensor signal or on the at least one actuator control signal, measuring an actual ozone concentration with an ozone concentration sensor at the output of the ozone generating machine, comparing the predicted ozone concentration with the actual ozone concentration, correcting and overwriting the set of sensor coefficients and the set of actuator coefficients of the system configuration file based on the actual ozone concentration if a discrepancy between the predicted ozone concentration and the actual ozone concentration is more than an ozone concentration threshold, when a power change higher than a power threshold is detected.

Advantageously, the ozone generating machine further comprises at least two electrodes separated by an ozonizing gap and a dielectric layer, and at least one electrode power sensor arranged for measuring a power consumed by the at least one electrode, the method further comprising:

supplying electric power to the a least two electrodes so as to create electric discharges in the ozonizing gap, monitoring the power consumed by the at least two electrodes, executing at least one of the steps of:

step 1 to 4, when a power change higher than a power threshold is detected.

This allows to detect an electrode power drift of the electrode actuator so that fixing of the ozone generating machine can be done and ozone generation can be kept efficient and appropriate. A prompt message can be issued to alert on the power change or power drift.

Advantageously, the ozone generating machine further comprising at least two electrodes, wherein the set of actuator coefficients comprises at least one electrode power coefficient, the method further comprising the step of:

correcting and overwriting the at least one electrode power coefficient of the system configuration file based on the actual ozone concentration and/or the discrepancy.

This enables to propose a highly efficient and flexible ozone generating machine, so that ozone concentration is maintained as desired, by adapting electrode power.

Advantageously, the ozone generating machine further comprises at least one pump, such as a oxygen circulation pump, wherein the set of actuator coefficients comprises a pump flow coefficient, the method further comprising the step of correcting and overwriting the pump flow coefficient of the system configuration file based on the actual ozone concentration and/or the discrepancy Advantageously, the ozone generating machine is supplied with oxygen under pressure, and further comprises a pressure regulator to regulate oxygen pressure flowing from oxygen supply to ozone generator where pressure is lower.

This allows to propose an efficient and adaptive ozone generating machine, so that ozone production is improved, by adapting pump flow of the pump actuator or compressor, or by adapting gas pressure.

A second aspect of the present invention concerns an ozone generating machine, comprising:

at least two electrodes, an electric power unit connected to the at least two electrodes, at least one sensor, at least one actuator.

at least one data storing device, comprising an end user data storing device wherein is writing a system configuration file comprising at least a set of sensor coefficients and a set of actuator coefficients, and a control unit arranged to control the at least one actuator, the electric power unit, the at least two electrodes, and to correct and overwrite the set of sensor coefficients and the set of actuator coefficients of the system configuration file, so as to implement the method according to the first aspect of the present invention.

In summary, the control unit is arranged to retrieve and read in the at least one data storing device the identification code, the basic setting file, the options setting file, to encode and write on the end user data storing device the system configuration file, to generate the at least one actuator control signal to control the at least one actuator: to receive the at least one sensor signal emitted by the at least one sensor signal, to determine the predicted ozone concentration, to compare it with the actual ozone concentration, to correct and overwrite the set of sensor coefficients and set of actuator coefficients of the system configuration file, to define the updated frequency to operate the said method, to correct and overwrite said updated frequency, to monitor consumable change, to monitor power consumed by electrode, and in a general manner to monitor sensors, and in general manner also to implement any step of the method for controlling the ozone generating machine.

This allows to propose an ozone generating machine with optimum control and efficiency, high flexibility and improved maintainability, arranged to implement a method according to the first aspect of the present invention.

Other features and advantages of the present invention will appear more clearly from the following detailed description of particular non-limitative examples of the invention, illustrated by the appended drawings where:

FIG. 1 represents a simplified ozone generating machine OGM comprising an ozone generator OG where a plurality of electrodes sets EKW are placed within a housing H, as shown in FIG. 3.

The ozone generating machine OGM comprises an Handler HDL, an identification code ID indicating a type of ozone generating machine, four data storing devices Mem1, Mem2, Mem3, Mem4, being attached or not the ozone generating machine OGM and being or not grouped in a single common data storing device, an human-machine interface HMI to allow communication between an operator OP and the ozone generating machine OGM, a set of sensor MS arranged for emitting at least one sensor signal SSI, a set of actuators ACT arranged to be controlled by at least one actuator control signal ACS, a calculation unit CPU arranged for implementing a method for controlling the ozone generating machine OGM below illustrated, an inlet or input O2IN arranged to supply oxygen from an consumable source OCS, such as oxygen bottles or oxygen batch, and an outlet or output O3OUT arranged to exhaust ozone, an inlet of water cooling WCIN and an outlet of water cooling WCOUT.

Said ozone generating machine OGM further comprises an ozone concentration sensor O3S installed or mounted at the output of the ozone generating machine OGM, and arranged for measuring an actual ozone concentration O3CA. The ozone generating machine OGM further comprises at least an ozone pressure sensor OPS, an ozone circulation flow sensor O3Q, an inlet water cooling temperature sensor IWCTS and an outlet water cooling temperature sensor OWCTS, an inlet water cooling flow sensor IWCQS and an outlet water cooling flow sensor OWCQS, an electrode power sensor EPS, an electrode intensity sensor and an electrode voltage sensor, a consumable source sensor CCS, a circulation pump sensor CPS, such as pressure sensor and/or flow sensor.

Figure 3:
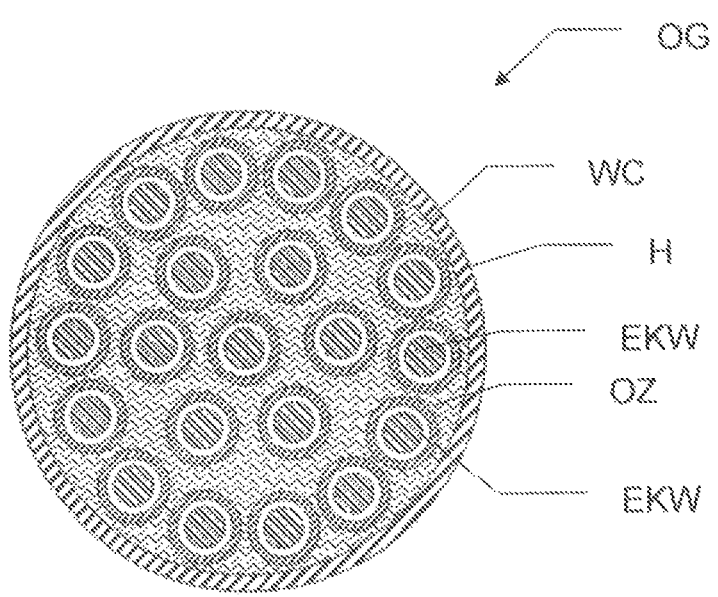
FIG. 3 represents a cross section of an ozone generator of the ozone generating machine of FIG. 1.

The ozone generating machine OGM further comprises at least an electric unit, an oxygen circulation pump OCP, and at least two electrodes EKW separated by an ozonizing gap OZ shown in FIG. 3 and a dielectric layer, wherein oxygen is supplied from the inlet O2IN of the ozone generating machine OGM by the oxygen circulation pump OCP to the ozonizing gap OZ where electrical power in form of electrical discharges allowing corona effect is transforming the oxygen into ozone, circulated to the outlet or output O3OUT of the ozone generating machine OGM. The ozone generating machine OGM further comprises a water cooling circuit arranged for cooling the electrodes EKW, comprising said water cooling inlet WCIN and said water cooling outlet WCOUT.

In an embodiment, the electrodes are metallic, and the dielectric layer comprises a ceramic coating, applied onto at least one of the electrodes.

The ozone generating machine OGM further comprises a system configuration file Sysconf, comprising a set of sensor coefficients SK and a set of actuator coefficients AK.

Figure 1:
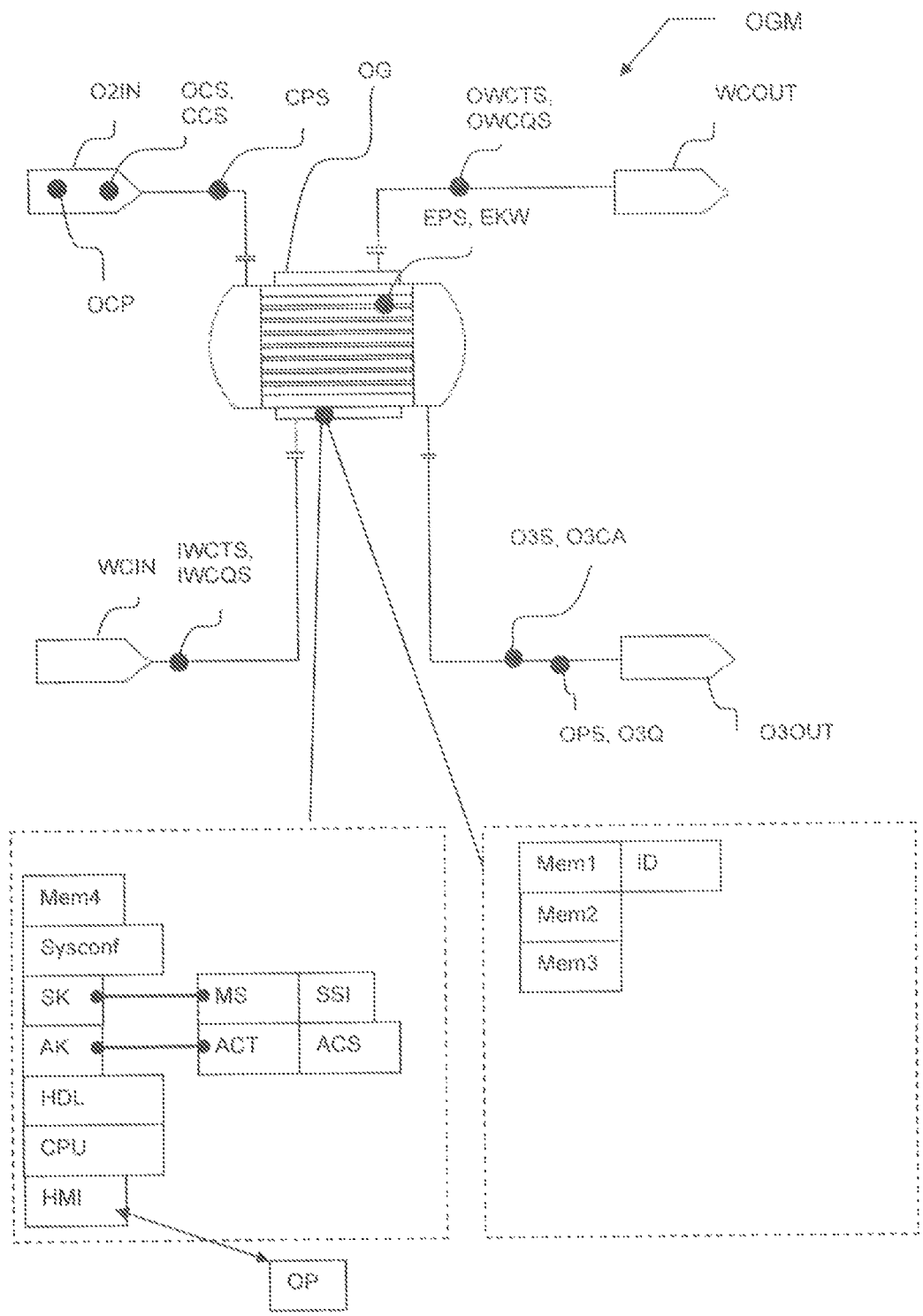
FIG. 1 represents an ozone generating machine according to the present invention.
Figure 2:
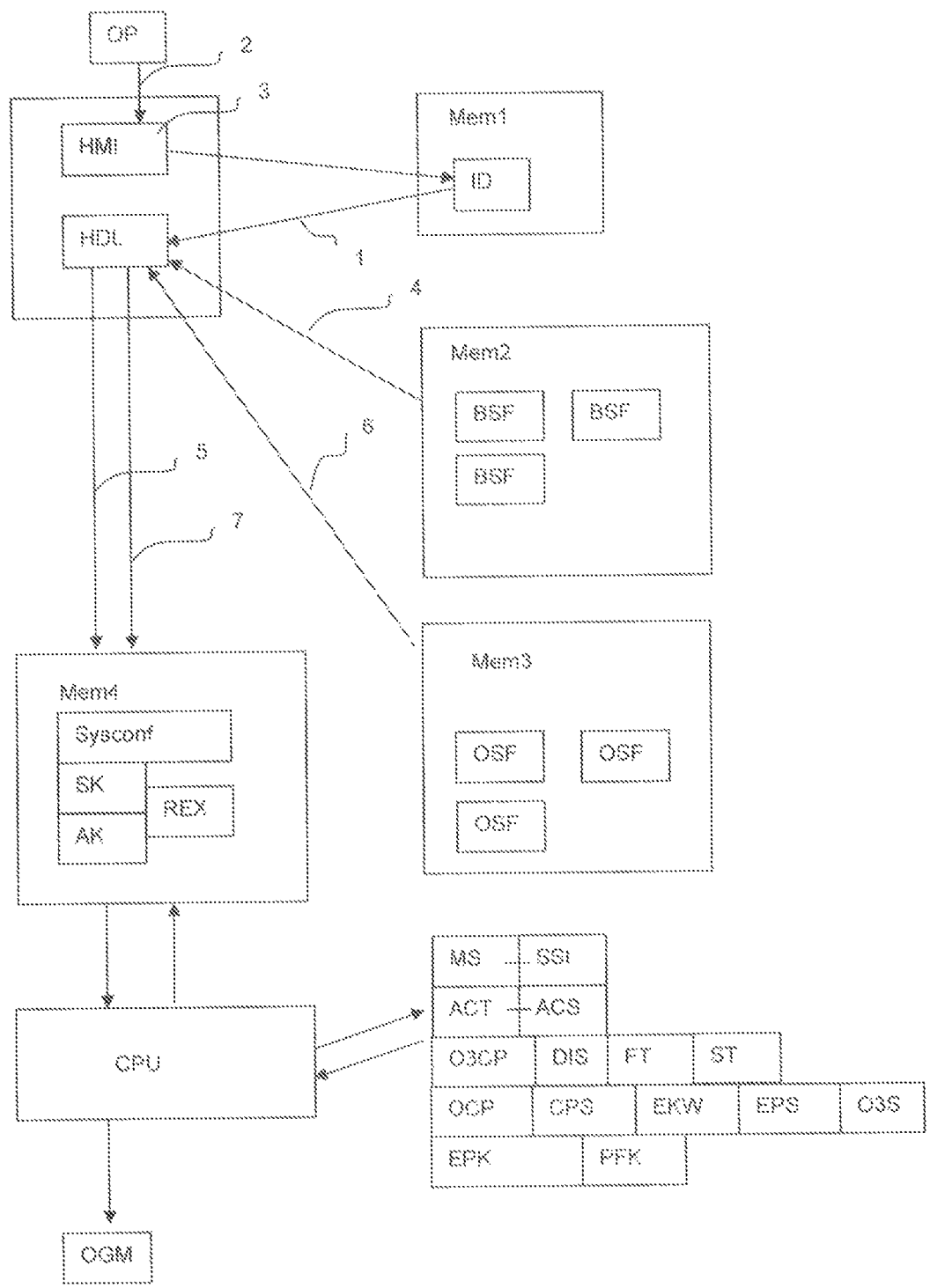
FIG. 2 represents a method for controlling an ozone generating machine according to the present invention.

FIG. 2 represents a method for controlling an ozone generating machine according to the present invention.

The operator OP is connecting to the ozone generating machine OGM the second data storing device Mem2 storing a set of base of setting files BSF, wherein each base setting file BSF is dedicated to a type of ozone generating machine OGM. This connection can be done either by connecting an USB storing device to a receiving docket of the machine OGM, by connecting the machine OGM to a Wi-Fi network in relation with the second data storing device Mem2, by connecting the machine OGM to a server with authentication key, or the like.

The handler HDL, part of the ozone generating machine OGM, is retrieving and reading 1 the identification code ID of the ozone generating machine OGM. In the example given only for illustration, the identification code has been put through 3 the human-machine interface HMI by 2 the operator OP in the first data storing device Mem1.

Then, the Handier HDL retrieves and reads in the second data storing device Mem2 a dedicated base setting file BSF corresponding to the type of ozone generating machine OGM indicated by the identification code ID.

Then, the Handler HDL encodes and writes 5 on the forth data storing device Mem4 the system configuration file Sysconf based on the dedicated base setting file BSF. The system configuration file Sysconf comprises the set of sensor coefficients SK and the set of actuator coefficients AK.

Then, the Handler HDL retrieves 6 on the third data storing device Mem3 storing a set of options setting files OSF an options setting file OSF corresponding to the type of ozone generating machine OGM indicated by the identification code ID.

Then, the Handler HDL overwrites 7 a part of the system configuration file Sysconf based on the options setting file OSF, adding or replacing part of the system configuration file Sysconf.

Then, the ozone generating machine OGM is producing ozone, with the step of correcting the at least one sensor signal SSI emitted by the at least one sensor MS with at least one sensor coefficients SK or actuating the at least one actuator ACT with the at least one actuator control signal ACS corrected by at least one actuator coefficients AK, thanks to the calculation unit CPU.

In other words, the sensors MS are calibrated thanks to the sensor coefficients SK which correct the sensor signals SSI so that corrected signals or corrected values are available, in order to represent the real physical situation of the ozone generating machine OGM. In a similar manner, the actuator coefficients AK are correcting the actuators signals ACS so that the actuators AC are well controlled.

Then, method further comprises a step of determining a predicted ozone concentration O3CP at the output of the ozone generating machine OGM, based on the sensor signals SSI and the actuator control signals ACS. In other words, the predicted ozone concentration O3CP is based on the pump flow value or measure given by the oxygen circulation pump OCP and measured by the circulation pump sensor CPS and on the power consumed by the two electrodes EKW separated by the ozonizing gap and the dielectric layer, and measured by the electrode power sensor EPS. Other sensor signals SSI and actuator control signals ACS may be used in order to refine the predicted ozone concentration O3CP, In an advantageous example, oxygen circulation pump OCP is a compressor and the ozone generating machine OGM further comprises a pressure regulator such as a relief valve or a pressure valve so that oxygen under pressure is supplied to the ozone generator OG where pressure is lower.

Then, the actual ozone concentration O3CA is measured thanks to the ozone concentration sensor O3S and compared to the predicted ozone concentration O3CP.

If a discrepancy DIS is revealed, that is to say a discrepancy DIS is higher than an ozone concentration threshold FT, the set of sensor coefficients SK and the set of actuators coefficients AK is corrected and overwritten, based on the actual ozone concentration O3CA and/or the discrepancy DIS. Although the correction is preferred to be made with the actual ozone concentration O3CA and/or the discrepancy DIS, the correction and overwriting can be made with any other relevant sensor signals SSI or actuator control signals ACS, or any other relevant information linked to the ozone generating machine OGM production.

In other words, if the prediction of ozone concentration is false or showing a time drift, the set of sensor coefficients SK and set of actuator coefficients AK should be updated accordingly, to retrieve the expected or desired ozone concentration, as it is well known that ozone generating machine are producing ozone with the time drift.

For example, the set of actuator coefficients AK can be corrected by increasing the value of the coefficients corresponding respectively PFK, EPK to the flow of oxygen circulation pump OCP or to the power consumed by the electrodes EKW, so that a desired ozone concentration is reached again.

The ozone concentration sensor O3S can be mounted directly at the output O3OUT of the ozone generating machine OGM or on a distribution circuit located downstream the output O3OUT of the ozone generating machine OGM, so that the ozone concentration sensor O3S can be either installed on a new machine, than on a revamped machine, already installed and running since a certain time, for which a better control of the ozone concentration is desired.

The previous steps can be done on a regular basis according the ozone production, but also at higher frequency or more regularly. In other words, when a drift is detected on the ozone production or on the ozone concentration, the step of determining the predicted ozone concentration O3CP, measuring the actual ozone concentration O3CA and comparing the predicted ozone concentration O3CP to the actual ozone concentration O3CA, and correcting and overwriting the set of correcting and overwriting the set of sensor coefficients SK and the set of actuator coefficients AK of the system configuration file Sysconf based on the actual ozone concentration O3CA if a discrepancy DIS between the predicted ozone concentration O3CP and the actual ozone concentration O3CA is more than an ozone concentration threshold FT, can be done more frequently or oftently, so that the drift of ozone production or ozone concentration is kept into control or avoided. The ozone concentration threshold FT can be defined at 10%, more preferably at 5%. To this aim, the ozone generating machine OGM further comprises an oscilloscope to measure the frequencies.

The ozone generating machine OGM is also equipped with the consumable source OCS such as oxygen tank or bottle or oxygen batch. The presence or status of the consumable source OCS is measured by the consumable source sensor CCS, emitting a status such as ready or empty. In other words, if the consumable source OCS is changed, this change can be monitored by the consumable source sensor CCS or entered by the operator OP via the human-machine interface HMI, and the determination of the predicted ozone concentration O3CA, measuring actual concentration O3CA, comparing both, and correcting and overwriting the set of sensor coefficients SK or actuators coefficients AK and/or any other step can be done so that desired ozone concentration is reached or maintained. That is to say the consumable source sensor CCS can be a mechanical presence sensor arranged for detecting a removal of the oxygen tank or bottle, or can be a flow sensor if the oxygen tank contains several oxygen batches and a switching between the oxygen batches is operated and detected by the flow sensor.

Other step can also be done, such as monitoring the power consumed by the electrodes EKW and executing the steps of determining the predicted ozone concentration O3CA and other relevant steps, if a power change higher than a power threshold ST is detected. The power threshold ST can be defined at 10%, more preferably at 5%.

Prompting a message to the operator OP can also be done to inform him about a ozone production drift, or any other information from the sensor signals or the predicted ozone concentration O3CP or actual ozone concentration O3CA.

In addition, it is therefore possible to deploy and update the set of sensor coefficients SK and the set of actuator coefficients AK from an advanced ozone generating machine OGM, for example having more options in the options setting files OSF and options installed on the ozone generating machine OGM directly, so that awareness of the machine or production is enhanced, to other ozone generating machines OGM from the installed park of machines, so that experience feedback or return REX can be implemented.

FIG. 3 shows that cooling water WC is present in the ozone generator OG. The ozone generator comprises an inlet of water cooling WCIN, and an outlet of water cooling WCOUT.

It is possible to produce ozone with a high efficiency and high management of the ozone generating machine OGM by determining the predicted ozone concentration O3CP, thereby trying to reach this value by the management of the set of sensor coefficients SK and set of actuator coefficients AK, and comparing the reached value of ozone, that is the measured ozone concentration or actual ozone concentration O3CA, and overwriting the set of coefficients SK, AK as necessary according to the discrepancy DIS detected between the predicted ozone concentration O3CP and the actual ozone concentration O3CA, to better adjust the running of the ozone generating machine OGM.

As an example, the predicted ozone concentration O3CP can be determined as follow:
the concentration is a function of feed gas pressure, power density, cooling water temperature, frequency of electric current applied to the ozone generator, specific flow as gas flow in kg/h per unit of active surface. The units for each parameters of the ozone generating machine OGM are indicated in parenthesis.

Ozone concentration (% by weight)=b0+b1*Pressure (bara)+b2*Power Density (kW/m2)+b3*cooling water temperature combinations (C)+b4*frequency (Hz)+b5*Specific Flow (kg/h/m2)+b6*Pressure (bara)*Pressure (bara)+b7*Pressure (bara)*Power Density (kW/m2)+b8*Pressure (bara)*cooling water temperature (C)+b9*Pressure (bara)*frequency (Hz)+b10*Pressure (bara)*Specific Flow (kg/h/m2)+b11*Power Density (kW/m2)*Power Density (kW/m2)+b12*Power Density (kW/m2)*cooling water Temperature (C)+b13*Power Density (kW/m2)*frequency (Hz)+b14*Power Density (kW/m2)*Specific Flow (kg/h/m2)+b15*cooling water temperature (C)*cooling water temperature (C)+b1B*cooling water temperature (C)*frequency (Hz)+b17*cooling water temperature (C)*Specific Flaw (kg/h/m2)+b18*frequency (Hz)*frequency (Hz)+b19*frequency (Hz)*Specific Flow (kg/h/m2)+b20*Specific Flow (kg/h/m2)*Specific Flow (kg/h/m2).

The coefficient b0 to b20 are given bellow, with a value of uncertainty+/−.

b0=6.18E+00+/−4.00E+00
b1=5.81E−02+/−4.00E−02
b2=2.20E+00+/−9.00E−01
b3=4.90E−02+/−3.50E−02
b4=−7.21E−04+/−5.00E−04
b5=−9.39E−01+/−6.00E−01
b6=−4.11E−01+/−2.00E−01
b7=3.13E−01+/−2.00E−01
b8=5.25E−03+/−3.00E−03
b9=−4.10E−05+/−2.00E−05
b10=1.21E−02+/−8.00E−03
b11=−2.76E−01+/−1.50E−01
b12=−1.87E−02+/−1.50E−02
b13=−1.88E−04+/−7.00E−05
b14=4.18E−02+/−1.50E−02
b15=−6.44E−04+/−4.00E−04
b16=−1.07E−05+/−8.00E−06
b17=2.55E−03+/−2.00E−03
b18=2.78E−07+/−2.00E−07
b19=1.12E−04+/−6.00E−05
b20=1.18E−02+/−5.00E−03

In other words, it is possible to have an auto-tune mode to control the ozone generating machine OGM, wherein the values of sensors are checked after a certain time of production and the set of coefficients SK, AK are overwritten to refine the control of the ozone generating machine OGM. It is also possible to have a quick regulation mode, to go faster to a given running point of the ozone generating machine OGM while was in an other running point.

As a running example, the ozone generating machine OGM is set to produce 5 kg/h of ozone at a certain concentration at the outlet of the machine. The request to change production to 7 kg/h comes from a plant control or from a user request: instead of sweeping power and flow to reach the new required production, the control unit will jump to value of power and gas flow supposed to deliver 7 kg/h, based on the parameters and sensors and actuators coefficients SK, AK. If the predictions is not fully adequate, some further proportional-integral-derivative controller, well known as PID controller, will be engaged to reach the target. Still the change from 5 to 7 kg/h will be quicker and control of the ozone generating machine OGM will be improved. The predetermined coefficients are relevant especially to allow this quick or fast regulation. The auto-tune mode has the role to make this regulation more precise. Furthermore, the auto-tune mode could reveal drifts in the system (self-diagnostic, pre-warning for defects, deterioration or the like).

The same can be done to jump to an other ozone concentration at the outlet of the machine, or to other parameter that the user would like to adjust.

Such a model is typically determined by running a measurement campaign according to a design of experiments (DoE) measurement plan. To determine the coefficients of the model describing the physical behaviour of the technology with changing variables, a prototype for each new technology or a machine of existing technology is connected to process control and measurement instrumentation, preferably with high precision/accuracy. Subsequently, a measurement plan with variables according to the rules of design of experiments is generated where all variables are varied over the required range [Ref.: Myers, Raymond H. Response Surface Methodology Boston: Allyn and Bacon, Inc., 1971]. This range could be, as an example:

ozone concentration between [1:5] %-wt
pressure between [1;2] bar-a
power density between [0.5;2.5] kW/m$^2$
cooling water temperature between [5:40]° C.
frequency between [500;1000] Hz.

Subsequently, a mathematical function suitable to model the physical behaviour of the system in the required range of values for each variable, in our case a fully quadratic polynomial of the form is chosen. After measuring a sufficient number of variable combinations, a linear regression analysis of the recorded dataset is performed in order to determine the exact values of all coefficients $b_i$ (i=0 . . . 20).

It should be noted that other mathematical functions, included but not limited to polynomials of different order, logarithmic or exponential functions, power functions, or combinations thereof could be used. It is of course understood that obvious improvements and/or modifications for one skilled in the art may be implemented, still being under the scope of the invention as it is defined by the appended claims.

The invention claimed is:

1. A method for controlling an ozone generating machine (OGM), the ozone generating machine comprising: a control unit, at least one sensor (MS) arranged for emitting at least one sensor signal (SSI) to the control unit, at least one actuator (ACT) arranged to be controlled by at least one actuator control signal (ACS) generated by the control unit; and an ozone generating machine identification code (ID), the method comprising the steps of:

connecting to the ozone generating machine (OGM) a data storing device (Mem2) storing a set of base setting files (BSF),
wherein each base setting file (BSF) is dedicated to a type of ozone generating machine (OGM), and
reading the ozone generating machine identification code (ID) indicating the type of the ozone generating machine (OGM), and
retrieving and reading on the data storing device (Mem2) a dedicated base setting file (BSF) corresponding to the type of the ozone generating machine (OGM) indicated by the identification code (ID), and
encoding and writing on an end user data storing device (Mem4) a system configuration file (Sysconf) based on the dedicated base setting file (BSF), the system configuration file (Sysconf) comprising at least a set of sensor coefficients (SK) and a set of actuator coefficients (AK),
producing ozone with the ozone generating machine (OGM), said ozone production step comprising at least a step of correcting the at least one sensor signal (SSI) emitted by the at least one sensor (MS) with at least one sensor coefficient (SK) belonging to the set of sensor coefficients (SK) and/or actuating the at least one actuator (ACT) with the at least one actuator control signal (ACS) corrected by at least one actuator coefficient (AK) belonging to the set of actuator coefficients (AK).

2. The method of claim 1, further comprising the steps of:
determining a predicted ozone concentration (O3CP) at an output of the ozone generating machine (OGM) based on the at least one sensor signal (SSI) or on the at least one actuator control signal (ACS),
measuring an actual ozone concentration (O3CA) with an ozone concentration sensor (O3S) at the output of the ozone generating machine (OGM),
comparing the predicted ozone concentration (O3CP) with the actual ozone concentration (O3CA), correcting and overwriting the set of sensor coefficients (SK) and the set of actuator coefficients (AK) of the system configuration file (Sysconf) based on the actual ozone concentration (O3CA) if a discrepancy (DIS) between the predicted ozone concentration (O3CP) and the actual ozone concentration (O3CA) is more than an ozone concentration threshold (FT).

3. The method of claim 2, further comprising the step of mounting the ozone concentration sensor (O3S) on the ozone generating machine (OGM) or on a distribution circuit located downstream an output connection of the ozone generating machine (OGM).

4. The method of claim 2, wherein the system configuration file (Sysconf) contains an initial frequency, and the method further comprising the steps of:
defining an updated frequency of the system configuration file (Sysconf) to operate at least one of the steps of claim 2 based on the actual ozone concentration (O3CA) and/or the discrepancy (DIS), and
correcting and overwriting said updated frequency of the system configuration file (Sysconf).

5. The method of claim 2, the ozone generating machine (OGM) further comprising at least one input (O2IN) arranged to supply oxygen from a consumable source (OCS), such as at least one oxygen tank, the method further comprising the step of executing at least one of the steps of claim 2 when the consumable source (OCS) is changed.

6. The method of claim 5,
the ozone generating machine (OGM) further comprising at least two electrodes (EKW) separated by an ozonizing gap (OZ) (OZ) and a dielectric layer, and at least one electrode power sensor (EPS) arranged for measuring a power consumed by the at least one electrode (EKW),
the method further comprising:
supplying electric power to the a least two electrodes (EKW) so as to create electric discharges in the ozonizing gap (OZ) (OZ),
monitoring the power consumed by the at least two electrodes (EKW), and
executing at least one of the steps of claim 2 when a power change higher than a power threshold (ST) is detected.

7. The method of claim 5,
the ozone generating machine (OGM) further comprising at least two electrodes (EKW), wherein the set of actuator coefficients (AK) comprises at least one electrode power coefficient (EPK),
the method further comprising the step of correcting and overwriting the at least one electrode power coefficient (EPK) of the system configuration file (Sysconf) based on the actual ozone concentration (O3CA) and/or the discrepancy (DIS).

8. The method of claim 7, the ozone generating machine (OGM) further comprising at least one oxygen pump, such as an oxygen circulation pump, wherein the set of actuator coefficients (AK) comprises a pump flow coefficient (PFK), the method further comprising the step of:
correcting and overwriting the pump flow coefficient (PFK) of the system configuration file (Sysconf) based on the actual ozone concentration (O3CA) and/or the discrepancy (DIS).

9. The method of claim 1, wherein:
the control unit of the ozone generating machine is arranged to control the at least one actuator (ACT), the electric power unit, the at least two electrodes, and to correct and overwrite the set of sensor coefficients (SK) and the set of actuator coefficients (AK) of the system configuration file (Sysconf); and
the ozone generating machine further comprises:
at least two electrodes (EKW) and an electric power unit connected to the at least two electrodes; and
at least one data storing device (Mem1, Mem2, Mem3, Mem4), comprising an end user data storing device (Mem4) wherein is writing a system configuration file (Sysconf) comprising at least a set of sensor coefficients (SK) and a set of actuator coefficients (AK).

* * * * *

UNITED STATES PATENT AND TRADEMARK OFFICE
CERTIFICATE OF CORRECTION

| | | |
|---|---|---|
| PATENT NO. | : 11,366,440 B2 | |
| APPLICATION NO. | : 16/622909 | |
| DATED | : June 21, 2022 | |
| INVENTOR(S) | : Martin Berchtold, Tito Scherrer and Luca Ramoino | |

It is certified that error appears in the above-identified patent and that said Letters Patent is hereby corrected as shown below:

On the Title Page

Item (73) Assignee:
The listed assignee of "E2INTERACTIVE, INC." should read -- SUEZ GROUPE --

Signed and Sealed this
Eleventh Day of April, 2023

Katherine Kelly Vidal
*Director of the United States Patent and Trademark Office*